United States Patent
Tan et al.

(10) Patent No.: US 10,349,400 B2
(45) Date of Patent: Jul. 9, 2019

(54) METHOD FOR GENERATING FREQUENCY HOPPING SEQUENCES FOR MULTI-TRANSCEIVER COGNITIVE RADIO NETWORKS

(71) Applicant: University of Electronic Science and Technology of China, Chengdu (CN)

(72) Inventors: Xuesong Tan, Chengdu (CN); Jieran Wang, Chengdu (CN); Yifan Wang, Chengdu (CN)

(73) Assignee: University of Electronic Science and Technology of China, Chengdu (CN)

( * ) Notice: Subject to any disclaimer, the term of this patent is extended or adjusted under 35 U.S.C. 154(b) by 0 days.

(21) Appl. No.: 15/836,947

(22) Filed: Dec. 11, 2017

(65) Prior Publication Data
US 2019/0021075 A1 Jan. 17, 2019

(30) Foreign Application Priority Data
Jul. 17, 2017 (CN) .......................... 2017 1 0581160

(51) Int. Cl.
*H04W 72/04* (2009.01)
*H04B 1/40* (2015.01)

(52) U.S. Cl.
CPC ............ *H04W 72/044* (2013.01); *H04B 1/40* (2013.01); *H04W 72/0406* (2013.01)

(58) Field of Classification Search
None
See application file for complete search history.

(56) References Cited

U.S. PATENT DOCUMENTS

| | | | | |
|---|---|---|---|---|
| 6,553,019 B1* | 4/2003 | Laroia | ................. | H04B 1/7143 370/206 |
| 2002/0177460 A1* | 11/2002 | Beasley | ............... | H04B 7/2662 455/502 |
| 2007/0133462 A1* | 6/2007 | Guey | .................. | H04B 1/7143 370/330 |
| 2008/0219324 A1* | 9/2008 | Park | ..................... | H04B 1/7143 375/132 |
| 2008/0285628 A1* | 11/2008 | Gizis | ..................... | A63H 30/04 375/135 |

(Continued)

*Primary Examiner* — Khaled M Kassim
(74) *Attorney, Agent, or Firm* — Gokalp Bayramoglu

(57) ABSTRACT

This invention relates to the field of communication technology, and particularly to a communication exchange mechanism design based on frequency hopping, which is applicable to cognitive radio networks. A method for generating hopping frequency sequences for multi-transceiver cognitive radio networks is provided, so as to realize the optimization and tradeoff of the five performance parameters, i.e. DoR, MTTR, ATTR, CL, and NSS. That, is, for a given DoR, the frequency-hopping system should minimize the NSS of the clock synchronous and asynchronous frequency-hopping systems under the condition of MTTR=ATTR=1 and CL<1. The frequency-hopping system of the present invention can use a minimal number of transceivers at each cognitive node to ensure that any two cognitive nodes always achieve frequency hopping rendezvous in each timeslot under the limiting conditions of a certain anti-jamming ability against the primary users and a certain degree of the most serious collisions of control information exchange.

2 Claims, 4 Drawing Sheets

(56) References Cited

U.S. PATENT DOCUMENTS

| | | | |
|---|---|---|---|
| 2009/0168846 A1* | 7/2009 | Filippo, III | H04B 1/7143 375/133 |
| 2010/0232310 A1* | 9/2010 | Hu | H04W 74/0808 370/252 |
| 2014/0376567 A1* | 12/2014 | Hui | H04W 72/1263 370/458 |
| 2015/0270868 A1* | 9/2015 | Park | H04W 28/0289 370/329 |

* cited by examiner

|  | Timeslot number: | 0 | 1 | 2 | 3 | 4 | 5 | 6 | 7 |
|---|---|---|---|---|---|---|---|---|---|
| Frequency hopping sequence set 0 | frequency hopping sequence 0 | 5 | 2 | 7 | 4 | 1 | 0 | 3 | 6 |
|  | frequency hopping sequence 1 | 6 | 3 | 0 | 5 | 2 | 1 | 4 | 7 |

|  | Timeslot number: | 0 | 1 | 2 | 3 | 4 | 5 | 6 | 7 |
|---|---|---|---|---|---|---|---|---|---|
| Frequency hopping sequence set 1 | frequency hopping sequence 0 | 6 | 3 | 0 | 5 | 2 | 1 | 4 | 7 |
|  | frequency hopping sequence 1 | 7 | 4 | 1 | 6 | 3 | 2 | 5 | 0 |

|  | Timeslot number: | 0 | 1 | 2 | 3 | 4 | 5 | 6 | 7 |
|---|---|---|---|---|---|---|---|---|---|
| Frequency hopping sequence set 2 | frequency hopping sequence 0 | 7 | 4 | 1 | 6 | 3 | 2 | 5 | 0 |
|  | frequency hopping sequence 1 | 5 | 2 | 7 | 4 | 1 | 0 | 3 | 6 |

Figure 1

|  | Timeslot number: | 0 | 1 | 2 | 3 | 4 | 5 | 6 | 7 |
|---|---|---|---|---|---|---|---|---|---|
| Frequency hopping sequence set 0 | frequency hopping sequence 0 | 5 | 2 | 7 | 4 | 1 | 0 | 3 | 6 |
|  | frequency hopping sequence 1 | 6 | 3 | 0 | 5 | 2 | 1 | 4 | 7 |
| Frequency hopping sequence set 1 | frequency hopping sequence 0 | 6 | 3 | 0 | 5 | 2 | 1 | 4 | 7 |
|  | frequency hopping sequence 1 | 7 | 4 | 1 | 6 | 3 | 2 | 5 | 0 |

Figure 2

|              | Timeslot number: | 0 | 1 | 2 | 3 | 4 | 5 | 6 | 7 |
|---|---|---|---|---|---|---|---|---|---|
| Frequency hopping sequence set 1 | frequency hopping sequence 0 | 6 | 3 | 0 | 5 | 2 | 1 | 4 | 7 |
|  | frequency hopping sequence 1 | 7 | 4 | 1 | 6 | 3 | 2 | 5 | 0 |
| Frequency hopping sequence set 2 | frequency hopping sequence 0 | 7 | 4 | 1 | 6 | 3 | 2 | 5 | 0 |
|  | frequency hopping sequence 1 | 5 | 2 | 7 | 4 | 1 | 0 | 3 | 6 |

Figure 3

|              | Timeslot number: | 0 | 1 | 2 | 3 | 4 | 5 | 6 | 7 |
|---|---|---|---|---|---|---|---|---|---|
| Frequency hopping sequence set 0 | frequency hopping sequence 0 | 5 | 2 | 7 | 4 | 1 | 0 | 3 | 6 |
|  | frequency hopping sequence 1 | 6 | 3 | 0 | 5 | 2 | 1 | 4 | 7 |
| Frequency hopping sequence set 2 | frequency hopping sequence 0 | 7 | 4 | 1 | 6 | 3 | 2 | 5 | 0 |
|  | frequency hopping sequence 1 | 5 | 2 | 7 | 4 | 1 | 0 | 3 | 6 |

Figure 4

| | | Timeslot number: | 0 | 1 | 2 | 3 | 4 | 5 |
|---|---|---|---|---|---|---|---|---|
| Frequency hopping sequence set 0 | frequency hopping sequence 0 | | 5 | 4 | 3 | 2 | 1 | 0 |
| | frequency hopping sequence 1 | | 0 | 5 | 4 | 3 | 2 | 1 |
| | frequency hopping sequence 2 | | 2 | 1 | 0 | 5 | 4 | 3 |

| | | Timeslot number: | 0 | 1 | 2 | 3 | 4 | 5 |
|---|---|---|---|---|---|---|---|---|
| Frequency hopping sequence set 1 | frequency hopping sequence 0 | | 0 | 5 | 4 | 3 | 2 | 1 |
| | frequency hopping sequence 1 | | 1 | 0 | 5 | 4 | 3 | 2 |
| | frequency hopping sequence 2 | | 3 | 2 | 1 | 0 | 5 | 4 |

| | | Timeslot number: | 0 | 1 | 2 | 3 | 4 | 5 |
|---|---|---|---|---|---|---|---|---|
| Frequency hopping sequence set 2 | frequency hopping sequence 0 | | 1 | 0 | 5 | 4 | 3 | 2 |
| | frequency hopping sequence 1 | | 2 | 1 | 0 | 5 | 4 | 3 |
| | frequency hopping sequence 2 | | 4 | 3 | 2 | 1 | 0 | 5 |

| | | Timeslot number: | 0 | 1 | 2 | 3 | 4 | 5 |
|---|---|---|---|---|---|---|---|---|
| Frequency hopping sequence set 3 | frequency hopping sequence 0 | | 2 | 1 | 0 | 5 | 4 | 3 |
| | frequency hopping sequence 1 | | 3 | 2 | 1 | 0 | 5 | 4 |
| | frequency hopping sequence 2 | | 5 | 4 | 3 | 2 | 1 | 0 |

| | | Timeslot number: | 0 | 1 | 2 | 3 | 4 | 5 |
|---|---|---|---|---|---|---|---|---|
| Frequency hopping sequence set 4 | frequency hopping sequence 0 | | 3 | 2 | 1 | 0 | 5 | 4 |
| | frequency hopping sequence 1 | | 4 | 3 | 2 | 1 | 0 | 5 |
| | frequency hopping sequence 2 | | 0 | 5 | 4 | 3 | 2 | 1 |

| | | Timeslot number: | 0 | 1 | 2 | 3 | 4 | 5 |
|---|---|---|---|---|---|---|---|---|
| Frequency hopping sequence set 5 | frequency hopping sequence 0 | | 4 | 3 | 2 | 1 | 0 | 5 |
| | frequency hopping sequence 1 | | 5 | 4 | 3 | 2 | 1 | 0 |
| | frequency hopping sequence 2 | | 1 | 0 | 5 | 4 | 3 | 2 |

METHOD FOR GENERATING FREQUENCY HOPPING SEQUENCES FOR MULTI-TRANSCEIVER COGNITIVE RADIO NETWORKS

CROSS REFERENCE TO RELATED APPLICATIONS

This application is based upon and claims priority to Chinese Patent Application No. 201710581160.3, filed on Jul. 17, 2017, the entire contents of which are incorporated herein by reference.

TECHNICAL FIELD

This invention relates to the field of telecommunication and particularly to a communication exchange mechanism design based on frequency hopping, which is applicable to cognitive radio networks.

BACKGROUND

In order to use the available spectrum resources flexibly and communicate without interfering the communication of primary users, the cognitive radio networks should have an efficient and reliable control information exchange mechanism so as to exchange all kinds of control information including spectrum sensing result, network topology, clock synchronization, and communication resources reservation among cognitive nodes. The control information exchange mechanism based on frequency hopping can flexibly and quickly find out idle communication frequency bands, which are not occupied by the primary users, through continuously changing the communication frequency band (or channel). Thus, the interference of the communication of primary users can be addressed properly.

During the control information exchange based on frequency hopping, only when at least one transceiver of the cognitive sending node and at least one transceiver of the cognitive receiving node achieves the frequency rendezvous. i.e., the transceivers of the two nodes hop to the same channel in the same timeslot, the two nodes can realize the exchange of the control information. In order to ensure that the exchange of the control information in the cognitive radio network operates smoothly, each cognitive node needs to provide a frequency hopping sequence for each configured transceiver thereof. Moreover, the frequency hopping sequences provided for all transceivers of the node form a frequency hopping sequence set. When all cognitive nodes in the entire network generate the frequency hopping sequences based on the same rule, all frequency hopping sequence sets generated based on the rule form a frequency-hopping system. If each cognitive node selects the frequency hopping sequence set from the frequency-hopping system independently and randomly, any two cognitive nodes can always exchange the control information based on the frequency hopping rendezvous without the prior knowledge of their frequency hopping sequences. As different pairs of cognitive nodes can rendezvous at different channels in the same timeslot, the problem of the saturation of a single fixed control channel caused by the control information exchange of the cognitive radio network can be efficiently avoided. Therefore, how to design a frequency-hopping system for the cognitive radio network, which can be used by all cognitive nodes of the entire network, plays a key role in the performance of the control information exchange of the cognitive radio network based on the frequency hopping rendezvous.

Usually, parameters to evaluate the performance of a frequency-hopping system include:

Degree of rendezvous (DoR): the total number of channels in which any two frequency hopping sequence sets in the frequency-hopping system can rendezvous. Normally, larger the DoR, more reliable is the control information exchange based on frequency hopping rendezvous, and stronger is the anti-jamming ability against the primary user.

Average time-to-rendezvous (ATTR): the average time interval between two consecutive rendezvouses of any two frequency hopping sequence sets in the frequency-hopping system. Normally smaller the ATTR, shorter is the average delay of control information exchange based on frequency hopping rendezvous, and better is the performance of the control information exchange.

Maximum time-to-rendezvous (MTTR): the maximum time interval between two consecutive rendezvouses of any two frequency hopping sequence sets in the frequency-hopping system. Normally, smaller the MTTR, shorter is the maximum delay of control information exchange based on the frequency hopping rendezvous, and better is the performance of the control information exchange.

Channel loading (CL): the ratio between the maximum number of frequency hopping sequence sets which can rendezvous in the same channel in the same timeslot, and the total number of the frequency hopping sequence sets in the frequency-hopping system. Obviously, the CL is within the range of [0, 1]. Normally, smaller the CL, lesser is the transmission collisions or congestions generated by control information exchange on the frequency hopping rendezvous in the cognitive radio network, and better is the performance of the control information exchange.

Number of sequences per set (NSS): the number of frequency hopping sequences contained in each frequency hopping sequence set of the frequency-hopping system. Since the cognitive node needs to provide one individual transceiver for each frequency hopping sequence in the frequency hopping sequence set, NSS actually represents the minimum number of transceivers that the cognitive node should have. Normally, smaller the NSS, fewer are the transceivers needed to achieve the control information exchange based on the frequency hopping rendezvous, and lower is the hardware complexity of the cognitive node.

Obviously, the theoretical lower bounds of the MTTR and ATTR of a frequency-hopping system both are 1. That is, any two frequency hopping sequence sets in the frequency-hopping system can always achieve the rendezvous and exchange the control information in any timeslot. On the other hand, under the limiting condition that the clock of the cognitive radio network node may be asynchronous, even if all cognitive nodes use the same frequency hopping sequence set, two cognitive nodes may not achieve the frequency hopping rendezvous on all accessible channels due to the difference of the start time of the frequency hopping.

SUMMARY OF INVENTION

The purpose of this invention is to design frequency-hopping systems for the clock synchronous and asynchronous cognitive radio networks to exchange control information, so as to realize the optimization and tradeoff of the five performance parameters, i.e. DoR, MTTR, ATTR, CL, and NSS. That, is, for a given DoR, the frequency-hopping system should minimize NSS of the clock synchronous and asynchronous frequency-hopping systems under the condition of MTTR=ATTR=1 and CL<1. The frequency-hopping system can use a minimal number of transceivers at each cognitive node to ensure that any two cognitive nodes always achieve frequency hopping rendezvous in each timeslot under the limiting conditions of a certain anti-jamming ability against the primary users and a certain degree of the most serious collisions of control information exchange.

In order to understand the technical solution of the present invention, the technical principles of this invention are introduced as follows.

Definition 1

If a k-element subset $A=\{a_0, a_1, \ldots, a_{k-1}\}$ of $Z_n=\{0, 1, \ldots n-1\}$ meets the following condition, for every non-zero integer $d \in Z_n$, there is at least one ordered pair $(a_i, a_j)$ satisfying $a_i \in A$, $a_j \in A$, and $d=a_i-a_j$ modulo n. Thus, the set A is called an (n,k)-relaxed cyclic difference set or (n,k)-DS in short.

Particularly, since all (n,k)-DSs should satisfy the constraint $n \leq k^2-k+1$ or its equivalent condition $k > \sqrt{n}$, when k approaches $\sqrt{n}$ as much as possible, the corresponding (n,k)-DS is further called an (n, k)-minimum difference set or (n, k)-MDS in short. For any $n \geq 2$, there is always at least one (n,k)-DS. Based on Definition 1, the following two Corollaries can be derived.

Corollary 1.

For an (n,k)-DS $A=\{a_0, a_1, \ldots, a_{k-1}\} \subseteq Z_n$, a k-element set $ROT(A, r)=\{a_0+r \text{ modulo } n, a_1+r \text{ modulo } n, \ldots, a_{k-1}+r \text{ modulo } n\} \subseteq Z_n$ generated by performing a rotation with a distance $r \in [0, n-1]$ is also an (n,k)-DS.

Corollary 2.

For an (n,k)-DS A, the formula $ROT(A,r_i) \cap ROT(A,r_j) \neq \emptyset$ $\forall r_i, r_j \in [0, n-1]$ is always established.

Definition 2

A permutation on the set $Z_n$ refers to a one-to-one mapping from the set $Z_n$ to itself. For example, the one-to-one mapping p satisfying $p(0)=1$, $p(1)=2$, ..., $p(n-2)=n-1$, $p(n-1)=0$ is a permutation on $Z_n$.

The technical solution of this invention is described as follows:

For a given DoR $M \geq 1$, a given upper bound $l_{max} \in [0,1]$ of CL, and a permutation p on the set $Z_M$, a synchronous frequency-hopping system can be generated. For a given DoR $M=n$ and a permutation p on the set $Z_M$ satisfying the limiting condition of $p(a+b)-p(a)=p(b)-p(0)$ modulo M $\forall a \in Z_M, b \in Z_M$, an asynchronous frequency-hopping system can be generated.

A method for generating frequency hopping sequences for multi-transceiver cognitive radio networks includes the following steps:

S1, setting parameters of a frequency-hopping system; wherein the frequency-hopping system includes n frequency hopping sequence sets; each frequency hopping sequence set include k frequency hopping sequences; a length of a period of each frequency hopping sequence is M timeslots;

S2, labeling the n frequency hopping sequence sets in the frequency-hopping system as 0, 1, 2, 3, ..., s, ..., n-1;

labeling k clock synchronous frequency hopping sequences in each frequency hopping sequence set as 0, 1, 2, 3, ..., r, ..., k-1;

labeling M timeslots in each period of each frequency hopping sequence as 0, 1, 2, 3, ..., t, ..., M-1;

labeling M rendezvous channels in the frequency-hopping system as 0, 1, 2, 3, ..., M-1;

wherein $0 \leq s \leq n-1$, $0 \leq r \leq k-1$, $0 \leq t \leq M-1$, and s, r, t are all integers;

S3, generating a minimum difference set (n,k)-MDS $A=\{a_0, a_1, \ldots, a_{k-1}\} \subseteq Z_n$.

S4, in a $i^{th}$ timeslot of each M-timeslot period, an $r^{th}$ frequency hopping sequence of an $s^{th}$ frequency hopping sequence set should hop to a channel labeled as $(b_{s,r}+p(t)$ modulo M), wherein $b_{s,r}=a_r+s$ modulo n.

Furthermore, the minimum deference set generated in the S3 specifically is:

for the synchronous frequency-hopping system:

S31, providing $k \geq 2$, defining an integer set $\Phi_k$, such that there is at least one $(\varphi,k)$-MDS for each $\varphi \in \Phi_k$; and providing $c_k=k/\varphi_{k,max}$, wherein $\varphi_{k,max}$ is the maximum value in the set $\Phi_k$;

S32, providing $c_1=1$; if there is an integer $k \geq 2$ such that $l_{max} \in [c_k, c_{k-1})$, the NSS parameter is set as k; providing $n=\varphi_{k,max}$ as the maximum value in the set $\Phi_k$; and generating a minimum difference set (n, k)-MDS $A=\{a_0, a_1, \ldots, a_{k-1}\} \subseteq Z_n$;

for an asynchronous frequency-hopping system:

based on the DoR value n, calculating the least number of elements k forming the minimum difference set (n, k)-MDS $A=\{a_0, a_1, \ldots, a_{k-1}\} \subseteq Z_n$; and providing k as the NSS parameter of the asynchronous frequency-hopping system.

The beneficial effects of this invention are described as below:

The frequency-hopping system of the present invention can ensure that any two cognitive nodes not only rendezvous in each timeslot but also rendezvous in M different channels in each period of MA timeslots based on the frequency hopping sequence set selected independently. Thus, the most serious collisions of control information exchange caused by all frequency hopping sequence sets rendezvousing at the same channel at the same time can be avoided.

The existing synchronous frequency-hopping systems used for control information exchange of the cognitive radio network cannot achieve any DoR=M, ATTR=MTTR=1, and CL<1 at the same time. The existing asynchronous frequency-hopping systems used for control information exchange of the cognitive radio network cannot achieve any DoR=n. ATTR=MTTR=1, and CL<1 at the same time. The frequency-hopping system of the invention solves these two problems.

When the upper bound value CL of the synchronous frequency-hopping system is $l_{max} \in [\frac{2}{3},1)$, k which is the NSS parameter of synchronous frequency-hopping system generated by the present invention based on (3,2)-MDS can achieve the theoretical lower bound 2 under the condition of any DoR=M, MTTR=ATTR=1, and CL<1. Thus, the required number of transceivers deployed at each cognitive node and the hardware complexity of the cognitive node can be effectively reduced. When the upper bound of CL of the synchronous frequency-hopping system is $l_{max} \in [0,1]$, k/n which is the CL of synchronous frequency-hopping system generated by the present invention based on (n, k)-MDS can approach the theoretical lower bound $1/\sqrt{n}$ closely. Accordingly, the collisions of the control information exchange confronted by each cognitive node pair whenever the frequency hopping rendezvous occurs can be effectively reduced.

Moreover, k which is the NSS parameter of asynchronous frequency-hopping system generated by the present invention based on (n,k)-MDS can approach the theoretical lower bound $\sqrt{n}$ closely. Thus, the required number of transceivers deployed at each cognitive node and the hardware complexity of the cognitive node can be effectively reduced. k/n which is the CL of asynchronous frequency-hopping system generated by the present invention based on (n, k)-MDS can approach the theoretical lower bound $1/\sqrt{n}$ closely. Accordingly, the collisions of the control information exchange confronted by each cognitive node pair whenever the frequency hopping rendezvous occurs can be effectively reduced.

BRIEF DESCRIPTION OF DRAWINGS

FIG. 1 depicts a synchronous frequency-hopping system with DoR=8, ATTR=MTTR=1, CL=2/3, and NSS=2 generated based on (3, 2)-MDS, i.e., $\{0, 1\} \in Z_3$, and a permutation p on $Z_8$, i.e., p(0)=5, p(1)=2, p(2)=7, p(3)=4, p(4)=1, p(5)=0, p(6)=3, p(7)=6.

FIG. 2 is a schematic diagram of the frequency hopping rendezvous of frequency hopping sequence sets 0 and 1.

FIG. 3 is a schematic diagram of the frequency hopping rendezvous of frequency hopping sequence sets 1 and 2.

FIG. 4 is a schematic diagram of the frequency hopping rendezvous of frequency hopping sequence sets 0 and 2.

FIG. 5 depicts an asynchronous frequency-hopping system with DoR=6, ATTR=MITR=1, CL=1/2, and NSS=3 generated based on a (6, 3)-MDS, i.e., $\{0, 1, 3\} \in Z_6$, and a permutation p on $Z_6$, i.e., p(0)=5, p(1)=4, p(2)=3, p(3)=2, p(4)=1, p(5)=0.

FIG. 6 is a schematic diagram of the frequency hopping rendezvous wherein two cognitive nodes with a clock difference of one timeslot both select the frequency hopping sequence set 1 shown in FIG. 1.

FIG. 7 is a schematic diagram of the frequency hopping rendezvous wherein two cognitive nodes with a clock difference of four timeslots respectively select the frequency hopping sequence sets 0 and 1.

DETAILED DESCRIPTION OF INVENTION

Hereinafter, the present invention is described with reference to the drawings.

Embodiment 1 (Synchronous Frequency-Hopping System)

The property parameters of the synchronous frequency-hopping system are given as follows. DoR=8, an upper bound of CL is $l_{max}$=2/3, and a permutation p on a set $Z_8$ is p(0)=5, p(1)=2, p(2)=7, p(3)=4, p(4)=1, p(5)=0, p(6)=3, and p(7)=6. When λ=2, since there is only one minimum difference set with two elements (3, 2)-MDS, the parameters in S31 should be $\Phi_\lambda = \Phi_2 = \{3\}$, $\varphi_{\lambda,max} = \varphi_{2,max} = 3$, and $c_\lambda = c_2 = 2/3$. Since $c_1 = 1$, $l_{max} = 2 3 \in [c_2, c_1)$. The NSS parameter of the synchronous frequency-hopping system should be k=2. Moreover, a minimum difference set (3,2)-MDS can be generated as $A=\{a_0, a_1\}=(0, 1) \in Z_3$ accordingly. According to Steps 3 and 4, the synchronous frequency-hopping system should include three frequency hopping sequence sets labeled as 0, 1, and 2 respectively. Each frequency hopping sequence set includes two frequency hopping sequences labeled as 0 and 1 respectively, which start the frequency hopping at the same time. Moreover, each period of each frequency hopping sequence includes 8 timeslots labeled from 0 to 7 respectively.

The 0th frequency hopping sequence of the 0th frequency hopping sequence set should hop to the channel labeled as $(b_{0,0}+p(t)$ modulo 8) in the timeslot t, wherein $b_{0,0}=a_0+0$ modulo 3=0. On the other hand, the 1st frequency hopping sequence of the 0th frequency hopping sequence set should hop to the channel labeled as $(b_{0,1}+p(t)$ modulo 8) in the timeslot t, wherein $b_{0,1}=a_1+0$ modulo 3=1. As a result, the 0th frequency hopping sequence of the 0th frequency hopping sequence set 0 of the synchronous frequency-hopping system is (5, 2, 7, 4, 1, 0, 3, 6), while the 1st frequency hopping sequence of the 0th frequency hopping sequence set is (6, 3, 0, 5, 2, 1, 4, 7). Similarly, three frequency hopping sequence sets of the synchronous frequency-hopping system as shown in FIG. 1 can be generated.

As shown in FIG. 2, FIG. 3, and FIG. 4, under the limiting condition that the start time of frequency hopping remains the same, any two frequency hopping sequence sets in the above synchronous frequency-hopping system can rendezvous in all eight channels within an 8-timeslot period. Moreover, the rendezvous can be achieved in different timeslots in different channels. Besides, just two different frequency hopping sequence sets can rendezvous in the same channel in each timeslot. Thus, the parameters of the above synchronous frequency-hopping system are DoR=8, ATTR=MTTR=1, CL=2/3, and NSS=2.

Embodiment 2 (Asynchronous Frequency-Hopping System)

The property parameters of the asynchronous frequency-hopping system are given as follows. DoR=6, a permutation p on a set $Z_6$ is p(0)=5, p(1)=4, p(2)=3, p(3)=2, p(4)=1, and p(5)=0. Apparently, for any two elements $a \in Z_6$ and $b \in Z_6$, the permutation p satisfies the limiting condition of p(a+b)−p(a)=p(b)−p(0) modulo 6. Since the minimum difference set defined on the set $Z_6$ includes three elements, n=6 and k=3. Thus, a minimum difference set (6,3)-MDS can be generated as $A=\{a_0, a_1, a_2\}=\{0, 1, 3\} \subseteq Z_6$ accordingly. Also, the NSS parameter of the asynchronous frequency-hopping system should be set as 3. The asynchronous frequency-hopping system should include six frequency hopping sequence sets labeled from 0 to 5 respectively. Each frequency hopping sequence set should include three frequency hopping sequences labeled as 0, 1 and 2 respectively. Moreover, each period of each frequency hopping sequence should include six timeslots labeled from 0 to 5.

The 0th frequency hopping sequence of the 0th frequency hopping sequence set should hop to the channel labeled as $(a_0+0+p(t)$ modulo 6) in the timeslot t. The 1st frequency hopping sequence of the 0th frequency hopping sequence set should hop to the channel labeled as $(a_1+0+p(t)$ modulo 6) in the timeslot t. The 2nd frequency hopping sequence of the 0th frequency hopping sequence set should hop to the channel labeled as $(a_2+0+p(t)$ modulo 6) in the timeslot t. As a result, the 0th frequency hopping sequence of the 0th frequency hopping sequence set 0 of the asynchronous frequency-hopping system is (5, 4, 3, 2, 1, 0). The 1st frequency hopping sequence of the 0th frequency hopping sequence set is $\{0, 5, 4, 3, 2, 1\}$. The 2nd frequency hopping sequence of the 0th frequency hopping sequence set is (2, 1, 0, 5, 4, 3). Similarly, all six frequency hopping sequence sets of the synchronous frequency-hopping system as shown in FIG. 5 can be generated.

Figures 6, 7:
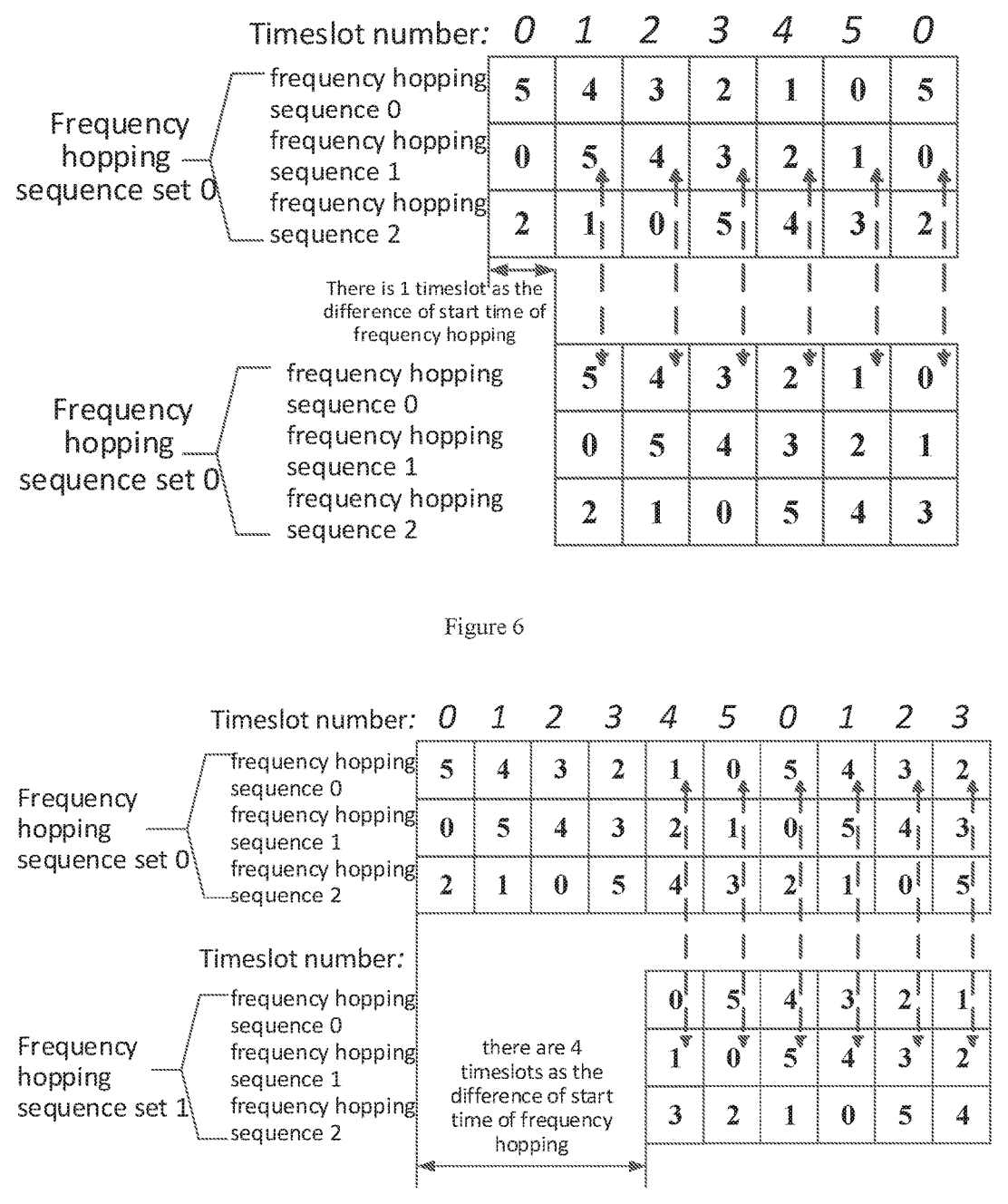

As shown in FIG. 6, when two cognitive nodes with an arbitrary clock difference (for example, one timeslot), both select the above frequency hopping sequence set 0 of the asynchronous frequency-hopping system, they can all rendezvous within six continuous timeslots. Moreover, in different timeslots, the rendezvous occurs in six different channels respectively. As shown in FIG. 7, when two cognitive nodes with an arbitrary clock difference (for example, four timeslots) respectively select the above frequency hopping sequence sets 0 and 1 of the asynchronous frequency-hopping system, they can all rendezvous within six continuous timeslots. Moreover, in different timeslots, the rendezvous occurs in six different channels respectively. Furthermore, no matter how large the time difference of the start time of the frequency hopping of all six frequency hopping sequence sets is, just three different frequency hopping sequence sets will rendezvous in the same channel in each timeslot. Thus, the property parameters of the asynchronous frequency-hopping system are DoR=6, ATTR=MTTR=1, CL=½, and NSS=3.

What is claimed is:

1. A method for generating hopping frequency sequences for multi-transceiver cognitive radio networks, comprising the following steps:

S1, setting parameters of a frequency-hopping system; wherein the frequency-hopping system includes n frequency hopping sequence sets; each frequency hopping sequence sets include k frequency hopping sequences; a length of a period of each frequency hopping sequence is M timeslots;

S2, labeling the n frequency hopping sequence sets in the frequency-hopping system as $0, 1, 2, 3, \ldots, s, \ldots, n-1$;

labeling k clock synchronous frequency hopping sequences in each frequency hopping sequence set as $0, 1, 2, 3, \ldots, r, \ldots, k-1$;

labeling M timeslots in each period of each frequency hopping sequence as $0, 1, 2, 3, \ldots, t, \ldots, M-1$;

labeling M rendezvous channels in the frequency-hopping system as $0, 1, 2, 3, \ldots, M-1$;

wherein $0 \leq s \leq n-1$, $0 \leq r \leq k-1$, $0 \leq t \leq M-1$, and s,r,t are all integers;

S3, generating a minimum difference set (n,k)-MDS $A=\{a_0, a_1, \ldots, a_{k-1}\} \subseteq Z_n$;

wherein, (n,k)-MDS=(n,k)-DS when k approaches $\sqrt{n}$;

where, (n,k)-DS is a k-element subset $A=\{a_0, a_1, \ldots, a_{k-1}\}$ of $\mathcal{C}_n=\{0, 1, \ldots, n-1\}$ such that, for every non-zero integer $d \subseteq \mathcal{C}_n$, there is at least one ordered pair $(a_i, a_j)$ satisfying $a_i \in A$, $a_j \in A$, and $d=a_i-a_j$ modulo n;

wherein, (n,k)-DS satisfies a constraint $n \leq k^2-k+1$ or an equivalent condition of the constraint $k > \sqrt{n}$;

S4, in a $t^{th}$ timeslot of each M-timeslot period, an $r^{th}$ frequency hopping sequence of an $s^{th}$ frequency hopping sequence set hops to a channel labeled as $(b_{s,r}+p(t)$ modulo M), wherein $b_{s,r}=a_r+s$ modulo n, and p is a one-to-one mapping defined over $Z_n=\{0, 1, \ldots, n-1\}$, $a_r$ is one element of the (n,k)-MDS generated by S3, and $0 \leq r \leq k-1$.

2. The method for generating frequency hopping sequences for multi-transceiver cognitive radio networks of claim 1, wherein the minimum deference set generated in the S3 specifically is for a synchronous frequency-hopping system S31, providing $k \geq 2$, defining an integer set $\Phi_k$, such that there is at least one $(\varphi, k)$-MDS for each $\varphi \in \Phi_k$; and providing $c_k=k/\varphi_{k,max}$, wherein $\varphi_{k,max}$ is the maximum value in the set $\Phi_k$;

S32, providing $c_1=1$; when an upper bound of a channel loading required by the synchronous frequency-hopping system is preset as $l_{max} \in [0,1]$, if there is an integer $k \geq 2$ such that $l_{max} \in [c_k, c_{k-1})$, then the number of frequency hopping sequences in each frequency hopping sequence set of the synchronous frequency-hopping system will be set as NSS=k; providing $n=\varphi_{k,max}$ as the maximum value in the set $\Phi_k$; and generating a minimum difference set (n, k)-MDS $A=\{a_0, a_1, \ldots, a_{k-1}\} \subseteq Z_n$;

for an asynchronous frequency-hopping system given that the number of rendezvous channels required by the asynchronous frequency-hopping system is preset as DoR=n, calculating the least number of elements k forming the minimum difference set (n,k)-MDS $A=\{a_0, a_1, \ldots, a_{k-1}\} \subseteq Z_n$; and providing NSS=k as the number of frequency hopping sequences in each frequency hopping sequence set of the asynchronous frequency-hopping system.

* * * * *